(12) United States Patent
Friesen

(10) Patent No.: US 6,416,133 B2
(45) Date of Patent: Jul. 9, 2002

(54) CONTROL DEVICE FOR TRAILER GATES

(75) Inventor: Leroy J. Friesen, Rosenort (CA)

(73) Assignee: Midland Manufacturing, Ltd., Rosenort (CA)

(*) Notice: Subject to any disclaimer, the term of this patent is extended or adjusted under 35 U.S.C. 154(b) by 0 days.

(21) Appl. No.: 09/759,278

(22) Filed: Jan. 16, 2001

Related U.S. Application Data

(63) Continuation of application No. 09/172,125, filed on Oct. 14, 1998.

(51) Int. Cl.[7] .............................. B60P 1/04; B60P 1/56; B60P 7/00
(52) U.S. Cl. .................... 298/35 M; 298/27; 298/29; 49/13
(58) Field of Search .............................. 298/25, 27, 29, 298/31, 33, 35 M, 35 R; 49/13

(56) References Cited

U.S. PATENT DOCUMENTS

| | | | |
|---|---|---|---|
| 3,404,650 A | * | 10/1968 | Miller et al. |
| 3,427,075 A | * | 2/1969 | Kress et al. |
| 3,596,565 A | * | 8/1971 | Atkinson |
| 3,981,539 A | * | 9/1976 | Proeschi et al. |
| 4,326,750 A | * | 4/1982 | Rosenbaum |
| 5,359,942 A | * | 11/1994 | Ward |

* cited by examiner

Primary Examiner—Stephen T. Gordon
Assistant Examiner—Scott Carpenter
(74) Attorney, Agent, or Firm—McFadden, Fincham

(57) ABSTRACT

A conventional dump trailer includes discharge members or doors which are typically mounted beneath the trailer. The movement of the doors is controlled by a control device of the present invention having a position sensor which is mounted on the trailer and a sensor actuator mounted on the discharge member. The amount of movement of a door is automatically limited at a preselected position. The control device allows for the discharge member to be further moved to further positions.

7 Claims, 4 Drawing Sheets

CONTROL DEVICE FOR TRAILER GATES

This is a Continuation-in-Part of application Ser. No. 09/172,125, filed Oct. 14, 1998.

FIELD OF INVENTION

This invention relates to dump trailers and the control of the movement of the gates of such trailers. In particular, one embodiment relates to a control device for a dump trailer for automatically halting the movement of at least one door or gate at a preselected position and an override enabling the door to be further moved to further positions.

Although the invention will be described and referred to as it relates to control arrangements for trailer gates or members, it will be understood that the principles of this invention are equally applicable to similar structures on other vehicles and accordingly, it will be understood that the invention is not limited to such structures and arrangements.

BACKGROUND OF THE INVENTION

Belly dump trailers are well known and widely used for transportation of gravel and other materials. Two common models of belly dump trailers include those having (1) clam shell gates which, when opened, create an opening at the bottom of the trailer hopper along its longitudinal axis of the trailer; and (2) those having cross dump gates or gates which, when opened, from an opening that is transverse to the longitudinal axis of the trailer. Two examples of a trailer of this type are shown in U.S. Pat. Nos. 5,131,722 issued on Jul. 21, 1992 and 5,294,186 issued on Mar. 15, 1994 to Decap. The trailers described in these patents consist of a hopper having gates at the bottom which may be opened to discharge pourable material.

Gate actuating means in the form of hydraulic or pneumatic cylinders and linkages are generally provided to move the gates from a closed position to an open position. In general, two gates or closure members are employed in most bottom dump trailers, although one gate can be employed.

Conventional trailer gates can be operated from the cab of a vehicle to which the trailer is attached. The control system is normally a simple on-off control for directly actuating the pneumatic or hydraulic cylinder. One major problem is that from the cab, the operator cannot observe the movement of the gates and hence accurately control the power to the hydraulic cylinder. When moving from the closed to the open position, the gates of such trailers will continue to open or until the gates contact an abutment mounted on the trailer frame until power is cut to the cylinder by the operator.

The gates contact the abutment with considerable force which places stress on the cylinders and seals which can lead to excessive and premature wear of the hydraulic cylinder. In addition, such sharp or strong contact with the abutment places stresses on gate pivot points and can result in premature gate failure such as by bending or warping of the gates or snapping of the pins which hold the abutments in place, resulting in repairs being needed.

In addition, in conventional trailers with abutment stops, two stops are generally employed with the operator having to adjust both stops when selecting a preset opening position.

The amount by which the gates are opened generally corresponds to the rate at which material is to be discharged from the hopper. Once pourable solid material has been removed from the hopper, often a residual amount of material remains. To remove this residual amount, the operator generally opens the hopper gates to the maximum open position before being closed. When physical stops are used as in conventional trailers, if the stops are first placed at preselected open positions for material to be poured from the hopper, they must then later be shifted to the maximum open position to allow the gates to fully open to facilitate residual material to pour from the hopper.

U.S. Pat. No. 5,294,186 issued to Decap attempts to address this problem by having a stop which can be moved out of the path of the gate as it opens to allow the gate to move from a preselected open position to the maximum open position. To accomplish this, however, the partially open gates must first be closed to relieve the pressure on the abutments to allow the abutment to be shifted out of the way and then the gates are reopened to the maximum open position.

Another limitation with the Decap style dump trailer opening abutments, is that the available preselected positions of the abutments are limited by the number of openings that can be made in the flange holding the abutment without affecting the structural integrity of the flange.

It is a feature of one embodiment of the invention to provide an improved arrangement to control the opening of trailer gates in which the drive means which moves the gates will automatically stop the movement of the gates at preselected locations without the need for abutment stops to restrain the opening movement of the gates.

It is a further feature of another embodiment of the invention to open the gates to the maximum open position after having been opened to a preselected open position, without the need to first close the gates.

It is a further feature of another embodiment of the invention to reduce the wear on the gate components.

Other objects will be apparent to those skilled in the art from the following specification, accompanying drawings and claims.

SUMMARY OF THE INVENTION

In a first embodiment of the invention, there is provided a dump trailer having a trailer body where the trailer body includes a moveable discharge member for providing access to the trailer body to permit discharge of contents therefrom, and movement means for effecting movement of the moveable discharge member from a first closed position to a second open position, and thereafter to return to the first closed position. According to this invention, the improvement comprises control means for controlling the actuation of the movement means, and where the control means comprises a position sensor means and sensor actuation means for actuating the sensor, upon relative movement between the position sensor means and the sensor actuation means.

In a preferred form, the above dump trailer has sensor actuation means which is selectively positionable to a preselected position corresponding to a predetermined open position of the moveable discharge member. The sensor actuation means can be swing arm, projection, pin or any other suitable trigger means.

In another preferred form, the above dump trailer has control means which includes a source of electrical power, and the movement means comprises a pneumatic or hydraulic system, or any other suitable like means with the control means being effective to control the movement means. The power source can be any suitable AC or DC source such as separate batteries, the vehicle battery, power generated by separate generators, etc.

The control means controlling the actuation of the pneumatic or hydraulic system for opening and closing the gates can be any suitable valve means such as one or more solenoid valves or other hand valve equivalents such as that known as a "Mac Valve". Preferably, a single valve control system is employed to control the operation of the pneumatic or hydraulic system. Such a control system is operatively connected to the pneumatic or hydraulic system to provide the requisite commands.

The control means desirably operates in conjunction with one or more switch means, which may be mounted in an operator's cab and/or on the trailer. In preferred embodiments, the control means, such as a valve system, is associated with a first switch means for controlling actuation of the position sensor means and consequently operation of the pneumatic or hydraulic closure system. In a still further embodiment, the second switch means operatively associated with the control means may be provided for-overriding the first switch means and directly controlling operation of the movement means as, for example, to permit further opening of the gate means.

Still further, third switch means may be provided operating in conjunction with the control means for providing a master on-off function for the control means. Conventional switches may be employed for this purpose.

In various trailer versions, a dump trailer includes a cab operatively associated with the trailer body, which may include a first switch means. Desirably, the cab also includes second and third switch means.

Generally, the dump trailer of the above type has position sensor means fixedly secured to the trailer separate from the moveable discharge member.

The above types of dump trailers will generally include a trailer frame including at least one hanger and at least one end wall, where the position sensor means is mounted on the hanger on the trailer frame, and the end wall has a plurality of mounting locations adapted to mount the sensor actuation means. Alternatively, or in combination with this feature, the position sensor means may be selectively positionable in a preselected position, and by effecting relative movement between the sensor means and the sensor actuation means, the sensor is effective to generate a control signal to control the operation of the pneumatic or hydraulic cylinder. As will be seen from the embodiments illustrated hereinafter, one preferred function upon such relative movement is the functioning of the sensor to halt operation through the control system of the opening of the gates so that the gates are opened to a predetermined position.

Various types of sensors may be employed so long as they are capable of detecting the position of a gate member during its opening movement. Such sensors are known per se in different fields.

In various trailer versions, the position sensor may be in the form of an electronic measuring means, which may be e.g., an electronic tape measure. Still further, one form of another embodiment is where the sensor means includes infrared means.

In another alternate embodiment, there is provided in a cab and dump trailer combination wherein said combination includes a source control device having sensor means for controlling movement means for opening and closing a discharge member in the dump trailer, said control device having a power source, the improvement comprising:

a first master switch means adapted to regulate power to said control device;

a second switch means adapted to permit sensor means to control said movement means;

a third switch means adapted to override said second switch means, wherein said second switch means is effective to bypass said first switch means; and said first, second and third switch means being operatively connected to said control device.

In still further alternate embodiment, there is provided a control device for controlling the movement of a gate on a dump trailer comprising:

drive means for moving the gate between a first position to a second position, said drive means being operatively connected to a control device position;

sensor means operatively connected to said control device, said sensor means being engageable at said second position of said gate such that said sensor means is effective to interrupt power from said power source to the drive means to thereby halt said drive means and thus halt movement of said gate at said second position; and sensor engaging means for engaging said sensor at said second position of said gate upon relative movement between said sensor means and said sensor engaging means.

In any of the above trailer versions, the control device has a sensor activation means or a position trigger which can be selectively set at any one of a number of preselected positions corresponding to preselected positions of the gate.

In the preceding trailer arrangement, the control device may include an override circuit for controlling the actuation of the hydraulic or pneumatic assemblies for moving the gates from a first preselected open position to a maximum open position. Still further, this control device may have sensor engaging means which may be a swing arm.

Accordingly, in a still further embodiment, the invention relates to a control device for controlling the movement of a gate on a dump trailer comprising, drive means for moving the gate from a stationary position to an end position. The drive means is operatively connected to a control system such as a control valve which may be connected to a power source. A position sensor means is also provided operatively connected to the power source. The said sensor means is engageable at an end position of the gate such that current from said power source to the drive means is interrupted and the drive means halted to halt the movement of the gate at an end position. A position trigger means is also provided for engaging the sensor at an end position of said gate. In another embodiment, the position trigger can be selectively set at any one of a number of preselected positions corresponding to preselected positions of the gate.

Another embodiment of the preceding control device includes an override circuit for moving the gates from a first preselected position to a maximum open position. A particular preferred embodiment of the position trigger means is a swing arm.

The above-described embodiments, and in particular those embodiments illustrated hereinafter, provide numerous advantages over the prior art. Now, an operator may control the operation of the opening and closing of the actuation means for the gate members by a simple and reliable system, which also provides the operator with advantageous features of selectively positioning the opening of the gate members and providing an override feature to permit further opening of gate members after reaching a first selected open position. Other advantages will also be evident from the various embodiments.

The invention is described hereinafter in greater detail with reference to the accompanying drawings, which illustrate a preferred embodiment of the invention.

DETAILED DESCRIPTION

Figure 1:
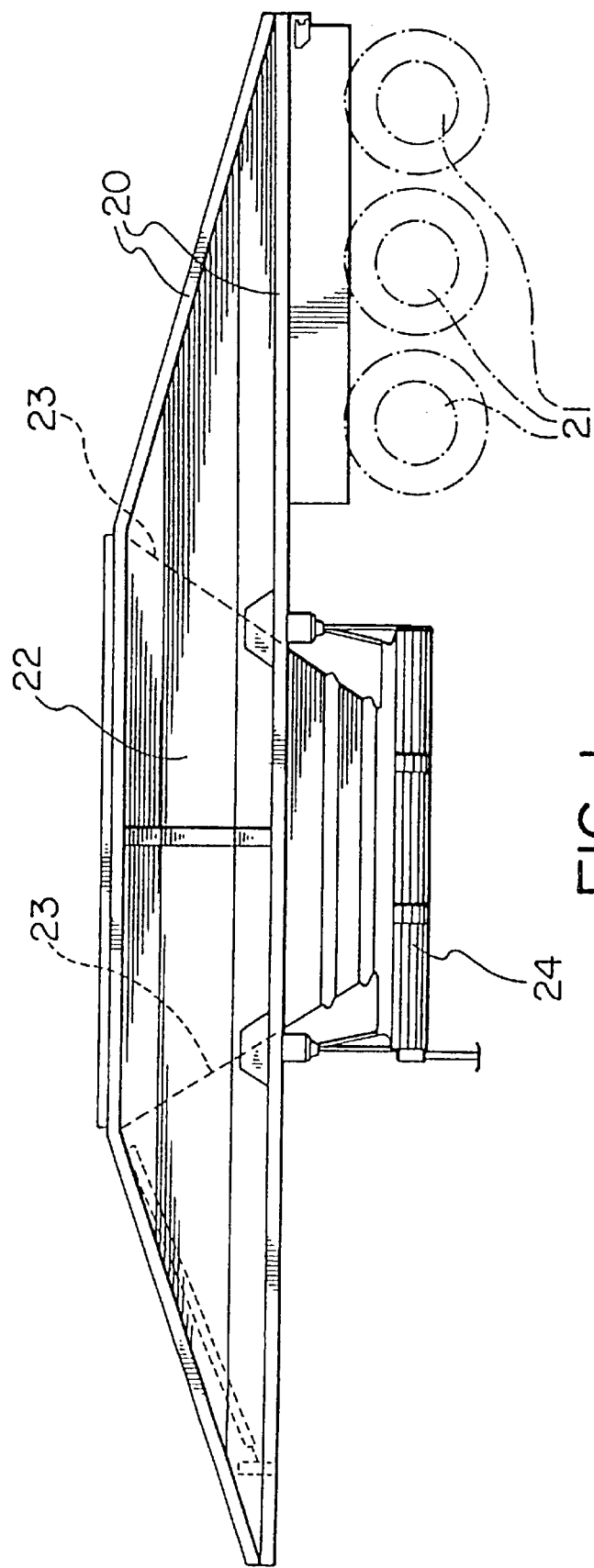
FIG. 1 is a side view of a conventional dump truck with hopper gates.

Referring to the accompanying drawings, the invention includes a conventional belly dump trailer which has a main frame 20, ground wheels 21, hopper 22, hopper side walls 23, clam shell hopper gates 24 suspended between front and rear hangers 25f and 25r by hinge pins 4 which pivotally mount the gates 24 to the hangers 24f and 25r. The hangers 25f, 25r are in turn mounted to the frame 20. Drive means for moving the gates outwardly from a stationary first position are shown, in the form of e.g., a hydraulic cylinder or piston 12.

Any conventional drive means such as hydraulic or pneumatic cylinders and appropriate linkages may be used to ensure symmetrical movement of the hopper gates. One example of the use of cylinders and linkages as a drive means for hopper gates is taught in the Decap references, supra. Double port air cylinders are preferred, however, which have a solenoid valve actuation system. When power is cut to the cylinder, the cylinder stops acting and holds its position until power is applied to move the cylinder to the closed position. One such cylinder is manufactured by Nordsen Metal Industries.

Figure 2:
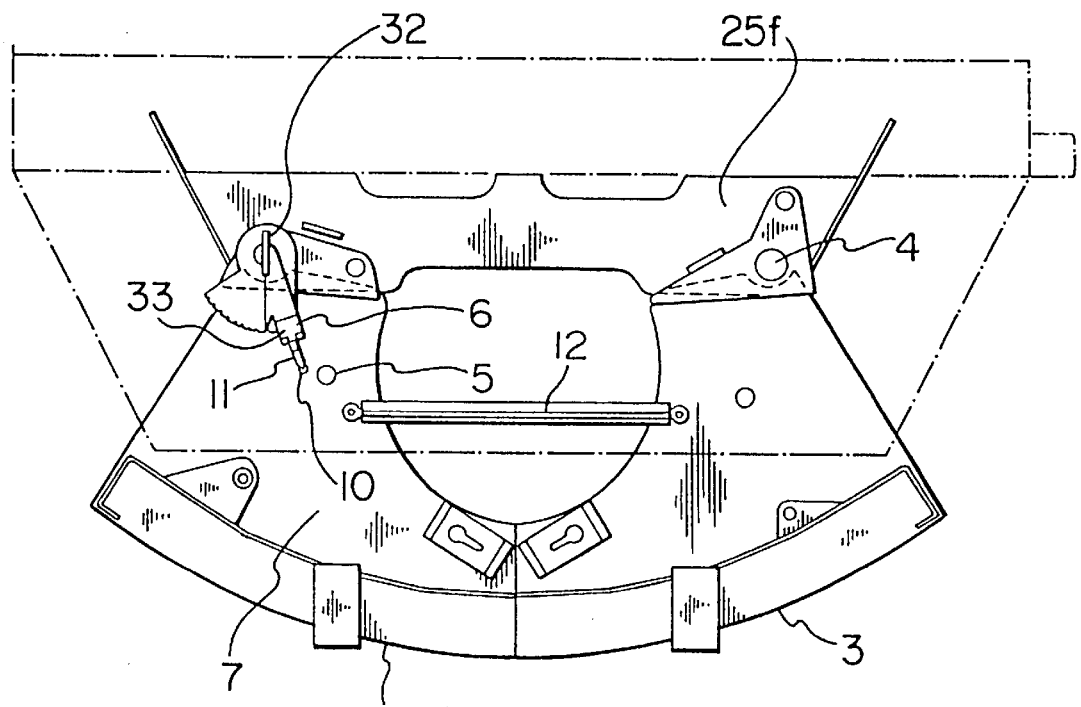
FIG. 2 is a front elevational view of the clam-shell gates showing the mounting of the sensor component and sensor engaging component.
Figure 3:
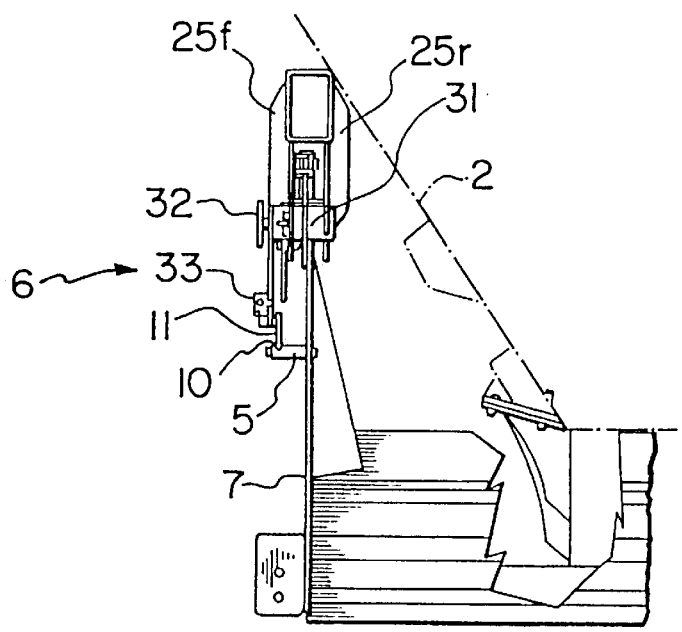
FIG. 3 is an enlarged partial side elevational view showing the sensor component and sensor engaging component in greater detail.
Figure 4:
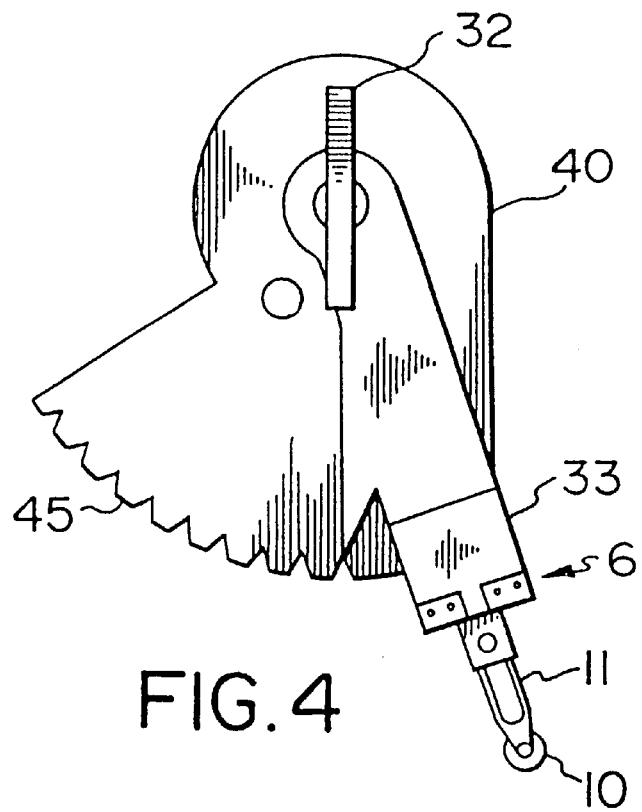
FIG. 4 is an enlarged view showing the mounting of the sensor.
Figure 5:
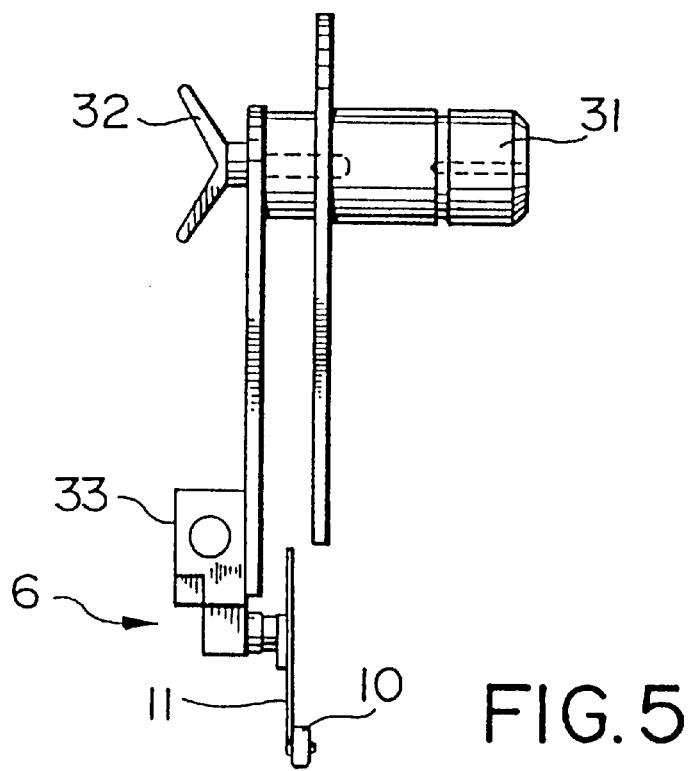
FIG. 5 is an enlarged side elevational view similar to FIG. 3 with certain structural dump truck components removed for the sake of clarity.

Sensor actuation means 5, e.g., a pin or a pipe projection functioning as a position trigger (shown in FIG. 2), is provided on an end sidewall 7 of the left hand hopper gate 3.

A position sensor assembly, as shown in FIGS. 2, 3, 4, and 5, includes housing 33 which mounts a suitable conventional sensor and is shown generally by 6. It is pivotally mounted to a mounting plate 40 or pin end plate through an adjustable lever arm 8, to the forward hanger 25f by means of a modified hinge pin 31 with a wing nut or threaded tightener 32 which can be hand tightened. Mounting plate or pin end plate 40 is mounted to the trailer hangers 25f, 25r. The wing nut or threaded tightener 32 can be loosened and the position sensor 6 swung to the desired position through adjustment notches 45 and then locked into place by tightening said nut. The position of the position sensor 6 will determine the opening position of the gates.

The position sensor 6 includes an adjustable roller lever having a roller head 10 attached to a lever arm 11. Sensor 6 is operatively connected to a power source and a switch described hereinafter.

Figure 6:
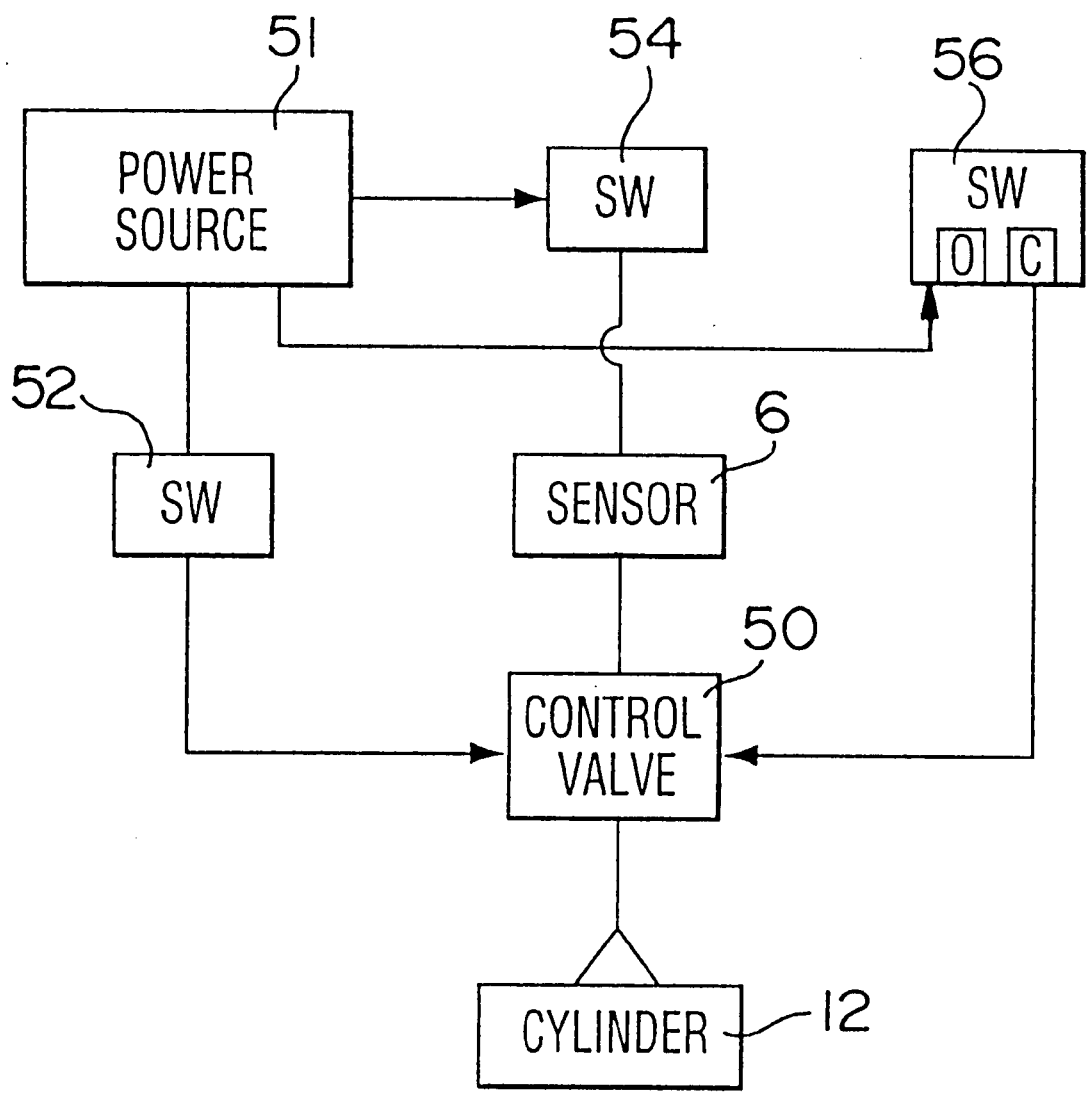
FIG. 6 is a schematic chart illustrating the control system of the present invention.

Referring now to FIG. 6, the schematic illustrates that the control system of the present invention includes a control valve 50 which is, for example, a "Mac Valve" available under this trademark. A power source 51 is operatively associated with the valve and various switches controlling different functions. A first switch 52 is provided, connecting the power source 51 to the control valve 50, to provide a master on-off switch for the valve 50.

A second switch 54 is provided functioning in conjunction with the sensor 6, which sensor 6 is operatively associated with control valve 50. Switch 54 operates in conjunction with lever arm 11 such that when the latter is in its resting position, that is in a non-operating position, the switch 54 is in an open position, power flows to the control valve 50 via switch 52, the control valve 50 controlling actuation of the piston assembly to permit opening of the gate. Thus, in operation, in greater detail, to begin a dump cycle, the switch 54 in the open position and the cylinder, for example hydraulic or air, is actuated by control valve 50. The movement of the cylinder in turn moves the gates through appropriate linkage means. As the gates 3 of the moveable discharge members or hopper move from a stationary and usually closed position to an open position, the sensor actuation means 5 will move together with the gate 3 to which it is attached until it engages the roller head 10. The point of engagement corresponds to the position at which the position sensor 6 is located.

Once contact is made with head 10, by the actuation means 5, the lever or swing arm 11 will be displaced resulting in closing of the switch 54. Closing of switch 54 permits power to pass to the control valve 50 to shut off the power supply via switch 52. This will halt movement of the cylinder 12 via the control valve 50, so that the gate will thus be in a predetermined open position.

A third switch 56, operatively connected to the power source 51, acts to override or by-pass switch 54. By closing switch 56 power is reconnected to the control valve 50 and thus control valve 50 is effective for further movement of the gates. By-pass switch 56 may also be used to effect closing of the gates to the desired degree, or totally, by controlling the valve 50 relative to actuation of the piston 12.

In practice, the by-pass switch 56 may be mounted at a convenient location on the trailer or in a cab associated with the trailer, or in both places. It is desirable to permit control of the gate in an override function to vary the opening during a dumping operation and for this purpose, switch 56 may be located in a readily accessible position on the trailer.

If it is desired to subsequently move the gates to the maximum open position in a second stage of opening movement, the switch 56 is actuated to re-activate valve 50 and thus to actuate piston 12. This will cause the gates to move from the stationary end position of the first stage of opening movement to a maximum open end position which occurs when the cylinder runs out of stroke and stops. This second stage opening facilitates the discharge of any residual material remaining in the hopper. Of course, a shorter dump cycle would have the operator close the gates after the first stage of opening movement.

In addition to by-pass switch 56 controlling closure of the gates, closure may also be effected as desired or required by cutting power to valve 50 through switch 52.

In another embodiment, the position sensor 6 is fixably mounted to either hanger 25f or 25r and the end wall 7 is fitted with a plurality of mounting locations such as openings 5a to receive the pipe projection 5. Each of the mounting locations corresponds to a preselected position of the gates 3 and by mounting the pipe projection 5 in one of the mounting locations, the position of the gate 3 can be preselected.

In another embodiment, hydraulic cylinders are employed such that once current is cut to the master control valve 50, the cylinder and hence the gates 3 return to their initial positions automatically as at the start of the dump cycle.

In a further embodiment, the position sensor 6 is fixably mounted and position trigger 5 is a swing arm mounted in one location on the end wall 7 but set to various positions corresponding to opening positions of the gates 3.

In a still further embodiment, the sensor actuating means or position trigger 5 can be fixably mounted on the trailer frame while the position sensor is mounted on a gate and moves with it.

In another embodiment, the position sensor means 6 is in the form of an electronic tape measure which is mounted to continually measure, by infrared means for example, the position of the gates 3. The electronic tape measure is calibrated to transmit positional information to a display in the cab.

The electronic tape measure in another embodiment can be used in conjunction with the position sensor 6 to automatically halt the movement of the gates 3 at a preselected position.

It would be understood by those skilled in the art that the position sensor 6 and the position trigger 5 can be mounted in various positions. The position sensor 6, may be mounted to the end wall, trailer frame or hangers. Position trigger 5 may be mounted in various positions, by e.g. being fixable in different points on the end wall to accomplish the result taught herein. For example, the mounting of the position sensor 6 and position trigger 5 can be reversed from that taught herein. It will also be understood by those skilled in the art that while the preferred embodiment is directed to an adjustable limit indicator for a belly dump trailer, the adjustable device can equally as well be employed to regulate the opening of similar gates in other trailers or vehicles.

I claim:

1. In a dump trailer having a moveable discharge member and means for opening and closing the discharge member, a control system for controlling the opening and closing of the discharge member comprising:

limit position sensing means mounted on said trailer adjacent said discharge member, wherein said limit position sensing means is a swing arm selectively positionable to a preselected position corresponding to a predetermined open position of said discharge member, an actuator on said discharge member for interaction with said limit position sensing means at a predetermined open position of said discharge means;

control means for controlling opening and closing of said discharge member;

a first switch for providing power to said control means;

a second switch actuated to cut off power to said control means on said interaction between said actuator and said limit position sensing means and halt opening of said discharge means;

a third switch operable to bypass said second switch and provide power to said control means for continued controlled opening of said discharge means.

2. An arrangement as claimed in claim 1, wherein said limit position sensing means is fixedly secured to said trailer separate from said moveable discharge member.

3. An arrangement as claimed in claim 1, including a trailer frame including at least one hanger and at least one end wall on said discharge member, wherein said limit position sensing means is mounted on said hanger on said trailer frame, and said end wall having a plurality of mounting locations adapted to mount said actuator.

4. An arrangement as claimed in claim 1, said limit position sensing means positioned to detect an open limit position.

5. An arrangement as claimed in claim 1, wherein said means for opening and closing said discharge member comprises a pneumatic or hydraulic system, said control means controlling actuation of said pneumatic or hydraulic system.

6. In a dump trailer including a trailer frame, said dump trailer having a moveable discharge member and means for opening and closing the discharge member; a control system for controlling the opening and closing of the discharge member comprising:

limit position sensing means mounted on said trailer adjacent said discharge member;

an actuator on said discharge member for interaction with said limit position sensing means at a predetermined open position of said discharge means;

said trailer frame including at least one hanger and at least one end wall on said discharge member, wherein said limit position sensing means is mounted on said hanger on said trailer frame, and said end wall includes a plurality of mounting locations adapted to mount said actuator;

control means for controlling opening and closing of said discharge member;

a first switch for providing power to said control means;

a second switch actuated to cut off power to said control means on said interaction between said actuator and said limit position sensing means and halt opening of said discharge means, and a third switch operable to bypass said second switch and provide power to said control means for continued controlled opening of said discharge means.

7. An arrangement as claimed in claim 6, said means for opening and closing said discharge member comprising solenoid operated valves, said control means powering said solenoid operated valves.

* * * * *